United States Patent
Jaffe

(10) Patent No.: US 6,466,973 B2
(45) Date of Patent: *Oct. 15, 2002

(54) METHOD AND SYSTEM FOR MANAGING STORAGE DEVICES OVER A NETWORK

(75) Inventor: David H. Jaffe, Belmont, CA (US)

(73) Assignee: Adaptec, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,615

(22) Filed: Mar. 6, 1998

(65) Prior Publication Data

US 2002/0002606 A1 Jan. 3, 2002

(51) Int. Cl.[7] ........................ G06F 15/173; G06F 9/00
(52) U.S. Cl. ...................... 709/223; 709/316; 707/513
(58) Field of Search ................................ 709/220, 222, 709/223, 225, 313, 316, 317, 328; 707/513; 710/17, 5; 345/333, 334, 335

(56) References Cited

U.S. PATENT DOCUMENTS

| | | | | |
|---|---|---|---|---|
| 5,475,845 A | * | 12/1995 | Orton | 709/328 |
| 5,491,796 A | * | 2/1996 | Wanderer et al. | 395/200.09 |
| 5,504,906 A | * | 4/1996 | Lutoff | 709/316 |
| 5,555,365 A | * | 9/1996 | Selby et al. | 395/159 |
| 5,668,992 A | * | 9/1997 | Hammer et al. | 395/651 |
| 5,751,967 A | * | 5/1998 | Raab et al. | 395/200.58 |
| 5,761,656 A | * | 6/1998 | Ben-Shachar | 707/4 |
| 5,822,585 A | * | 10/1998 | Noble | 709/316 |
| 5,832,298 A | * | 11/1998 | Sanchez et al. | 395/828 |
| 5,848,243 A | * | 12/1998 | Kulkarni | 709/224 |

(List continued on next page.)

OTHER PUBLICATIONS

Prywes, N. et al. "Automatic Abstraction of Real–Time Software and Re–implementation in Ada", ACM Confer. on Ada, pp. 238–247, Oct. 1991.*

Parvin, B. et al. "B–rep from Unregistered Multiple Range Images", IEEE Confer. on Robotcis and Automation, pp. 1602–1607, May 1992.*

(List continued on next page.)

*Primary Examiner*—Zarni Maung
*Assistant Examiner*—Jason D. Cardone
(74) *Attorney, Agent, or Firm*—Martine & Penilla, LLP

(57) ABSTRACT

Disclosed is a method, apparatus and system for managing generic objects and storage device objects over a network. In one aspect of the invention, the management apparatus' includes a management console having a graphical user interface for displaying a physical view and a logical view of a storage device. The management apparatus further includes a managed object of the storage device that is configured to communicate with the graphical user interface of the management console through a facet interface that is wrapped around the managed object. The facet interface is divided into a plurality of specific facets that communicate with the graphical user interface and enable the display of the physical view and the logical view of the storage device. In a further aspect of the present invention, the graphical user interface includes a plurality of generic views which are configured to communicate with associated ones of the plurality of specific facets of the facet interface. These aspects enable the facet interface of the managed object to be separate and de-coupled from a software code of the graphical user interface.

7 Claims, 11 Drawing Sheets

U.S. PATENT DOCUMENTS

| | | | | |
|---|---|---|---|---|
| 5,872,973 A | * | 2/1999 | Mitchell | 709/332 |
| 5,893,913 A | * | 4/1999 | Brodsky | 707/201 |
| 5,918,016 A | * | 6/1999 | Brewer et al. | 395/200.5 |
| 5,943,496 A | * | 8/1999 | Li | 790/328 |
| 5,978,594 A | * | 11/1999 | Bonnell et al. | 395/837 |
| 5,991,536 A | * | 11/1999 | Brodsky et al. | 395/704 |
| 6,003,047 A | * | 12/1999 | Osmond et al. | 707/513 |
| 6,009,466 A | * | 12/1999 | Axberg et al. | 709/220 |
| 6,016,392 A | * | 1/2000 | Jordan | 709/328 |
| 6,035,342 A | * | 3/2000 | Bernstein | 709/315 |
| 6,061,515 A | * | 5/2000 | Chang | 717/2 |
| 6,100,885 A | * | 8/2000 | Donnelly et al. | 345/333 |
| 6,108,664 A | * | 8/2000 | Nori et al. | 707/103 R |
| 6,134,540 A | * | 10/2000 | Carey et al. | 707/2 |
| 6,151,031 A | * | 11/2000 | Atkins et al. | 345/441 |
| 6,182,153 B1 | * | 1/2001 | Hollberg et al. | 709/315 |
| 6,192,419 B1 | * | 2/2001 | Aditham et al. | 709/315 |

OTHER PUBLICATIONS

Carlson, Dave "A Web of Technologies", Object Magazine, www.ontogenics.com/research/papers, Feb. 1997.*

Agrawal, R. et al. "Modeling Multidimensional Databases", IEEE Confer. on Data Engineering, pp. 232–243, Apr. 1997.*

McCulley, M. B. "Effective Virtual Design of Multi–dimensional data models and inferfaces", ACM NPIV, pp. 19–23, Nov. 1997.*

Cheng, Ngom et al. "Interoperability with Distributed Objects through Java Wrapper", IEEE COMPSAC, pp. 479–485, Oct. 2000.*

Karanjit et al., "Inside Java," 1997, New Riders Publishing, Indianapolis, IN, Chapters 13–17, pp. 513–814.

* cited by examiner

METHOD AND SYSTEM FOR MANAGING STORAGE DEVICES OVER A NETWORK

BACKGROUND OF THE INVENTION

1. Field of the Invention

This invention relates generally to management software, and more particularly to methods and systems for efficiently interfacing existing management user interfaces with networked computer and computer peripheral storage product lines.

2. Description of the Related Art

In order to stay competitive in today's business environment, more and more computer systems, storage devices, and peripheral devices are being networked together. As is well known, this degree of networking is needed to provide users with shared access to data that is stored on the various networked devices. Although networking devices provides users with a high degree of flexibility and shared access to data stored in numerous storage devices, these shared devices must be managed to ensure compatibility issues are addressed, and to monitor their operational status.

To accomplish such management tasks, FIG. 1A shows a management system 100 in which various storage devices 104a through 104d are networked to a management console computer 106. In this simplified example, the storage devices 104a–104d are shown directly coupled to a network 102, however, such storage devices are usually coupled to a networked computer via a host adapter. In conventional management systems 100, the management console computer 106 runs a graphical user interface 112, which is engineered to be compatible with the storage devices 104a–104d. As such, the software designer of the graphical user interface 112 is required to integrate the relationships, attributes and methods of each of the storage devices 104a–104d, so that the user of the management console computer 106 will actually be able to communicate (i.e., call) with and invoke the methods that control the storage devices 104a–104d.

A problem with conventional management systems 100 is that the storage devices 104a–104d are independently developed, tested and connected to a given network, which may produce compatibility issues. To avoid this, the software engineers that design the software (also known here as "the managed objects") for the various storage devices have to coordinate the design and interoperability of such storage devices with the software engineer of the graphical user interface 112. Although this works fine, this solution also creates a substantial amount of work for the software engineering team that programs the graphical user interface 112 for the management console computer 106 and slows down the release of new features.

For example, the software features that are integrated into the managed objects that are associated with each of the storage devices 104a–104b are frequently updated, modified or completely replaced with new releases. In some cases, the managed objects are redesigned once or twice a year. Although one or two modifications to the graphical user interface software is not necessarily a large undertaking, a typical network may have up to 20 different types of storage devices, each having its unique managed object. As a result, the software engineering team that programs the graphical user interface 112 may be required to make up to 40 or more code modifications a year to the graphical user interface code, just to keep up with the changes being independently performed by the developers of the managed objects. Many times, the changes may not get implemented into the graphical user interface 112 software due to time constraints and testing requirements, which therefore, may hamper or sever functional communication between the management console computer 106 and the various storage devices.

FIG. 1B is a block diagram illustrating the conventional communication protocols 110 that are exchanged between a group of managed objects 118a–118c and the graphical user interface 112. In one example, assume that the managed object 118c of a given storage device was recently updated without performing the necessary software manipulations to a managed object interface 114 of the graphical user interface 112. When this is the case, if the user of the management console computer 106 desires to print some data form a selected storage device, the managed object 118c will normally pass a data structure 116c to the managed object interface 114.

Unfortunately, a screen manager of the management console computer 106 will not be able to invoke any of the methods of the managed object 118c, because the data structure 116c will typically only contain the necessary data and pointers to methods. However, because the graphical user interface 112 was not updated with the necessary code to handle the data structure pointers of data structure 116c, the management console computer 106 will not be able to adequately manage the appearance, attributes and methods of the new or updated managed object 118c. Even if the data structure 116c contained the necessary icon for the new or updated managed object 118c, when the user of the management console computer 106 clicked on that icon, nothing would happen because the graphical user interface 112 was not previously updated to handle the new managed object 118c.

In view of the foregoing, what is needed is a method and system for designing managed objects so that they are able to inherently communicate with an existing management graphical user interface without having to custom upgrade the graphical user interface code for each new revision of a managed object.

SUMMARY OF THE INVENTION

Broadly speaking, the present invention fills these needs by providing methods, apparatus and systems for integrating custom facets that contain attributes, relationships and methods directly into a managed object to avoid the continual redesign of management graphical user interface software. It should be appreciated that the present invention can be implemented in numerous ways, including as a process, an apparatus, a system, a device, a method, or a computer readable medium. Several inventive embodiments of the present invention are described below.

In one embodiment, a method for making a managed object that is in communication with a management console that is used for storage device management over a network is disclosed. The method includes building an object having a data structure and a method for operating on the data structure. The object represents a set of basic functions of a storage device that is being managed over the network. The method also includes identifying at least one display function of the managed object that will be used to display a view of the managed object through the management console. In this embodiment, the at least one display function includes an attribute, a relationship, and a display method of the managed object. The method further includes appending the at least one display function to the managed object so that the managed object can communicate with the management console through the at least one display function. In a preferred aspect of this embodiment, the method includes generating a graphical user interface that is executed on the management console, and the graphical user interface is configured to communicate with the at least one display function of the managed object.

In another embodiment, an apparatus for managing storage devices over a network is disclosed. The management apparatus includes a management console having a graphical user interface for displaying a physical view and a logical view of a storage device. The management apparatus further includes a managed object of the storage device that is configured to communicate with the graphical user interface of the management console through a facet interface that is wrapped around the managed object. The facet interface is divided into a plurality of specific facets that communicate with the graphical user interface and enable the display of the physical view and the logical view of the storage device. In a further aspect of this embodiment, the graphical user interface includes a plurality of generic views which are configured to communicate with associated ones of the plurality of specific facets of the facet interface.

In yet another embodiment, a system for managing storage means over a network is disclosed. The system includes a management console means that has a graphical user interface for displaying one of a physical view and a logical view of a storage means. The system also includes a managed object means of the storage means that is configured to communicate with the graphical user interface of the management console means through a facet interface means that is wrapped around the managed object means. The facet interface means is divided into a plurality of specific facets that communicate with the graphical user interface and enable the display of either the physical view or the logical view of the storage means. In this embodiment, the graphical user interface of the system also includes a plurality of generic views which are configured to communicate with associated ones of the plurality of specific facets of the facet interface means.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for methods, apparatus and systems for integrating custom facets that contain attributes, relationships and methods directly into a managed object to avoid the continual redesign of management graphical user interface software. It will be obvious, however, to one skilled in the art, that the present invention may be practiced without some or all of these specific details. In other instances, well known process operations have not been described in detail in order not to unnecessarily obscure the present invention.

Figure 1A:
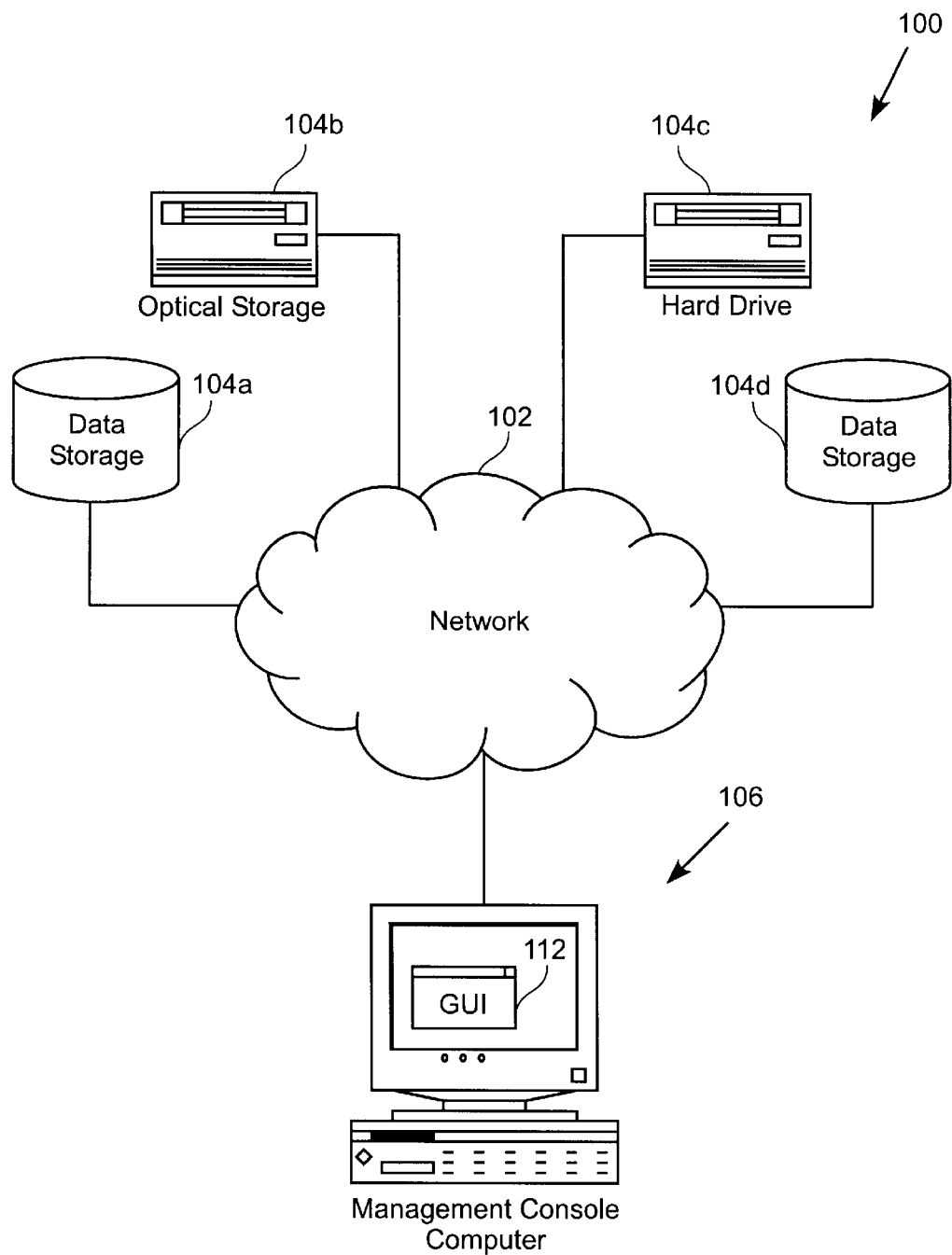
FIG. 1A is a physical representation of a management architecture that is used to manage networked storage devices.
Figure 1B:
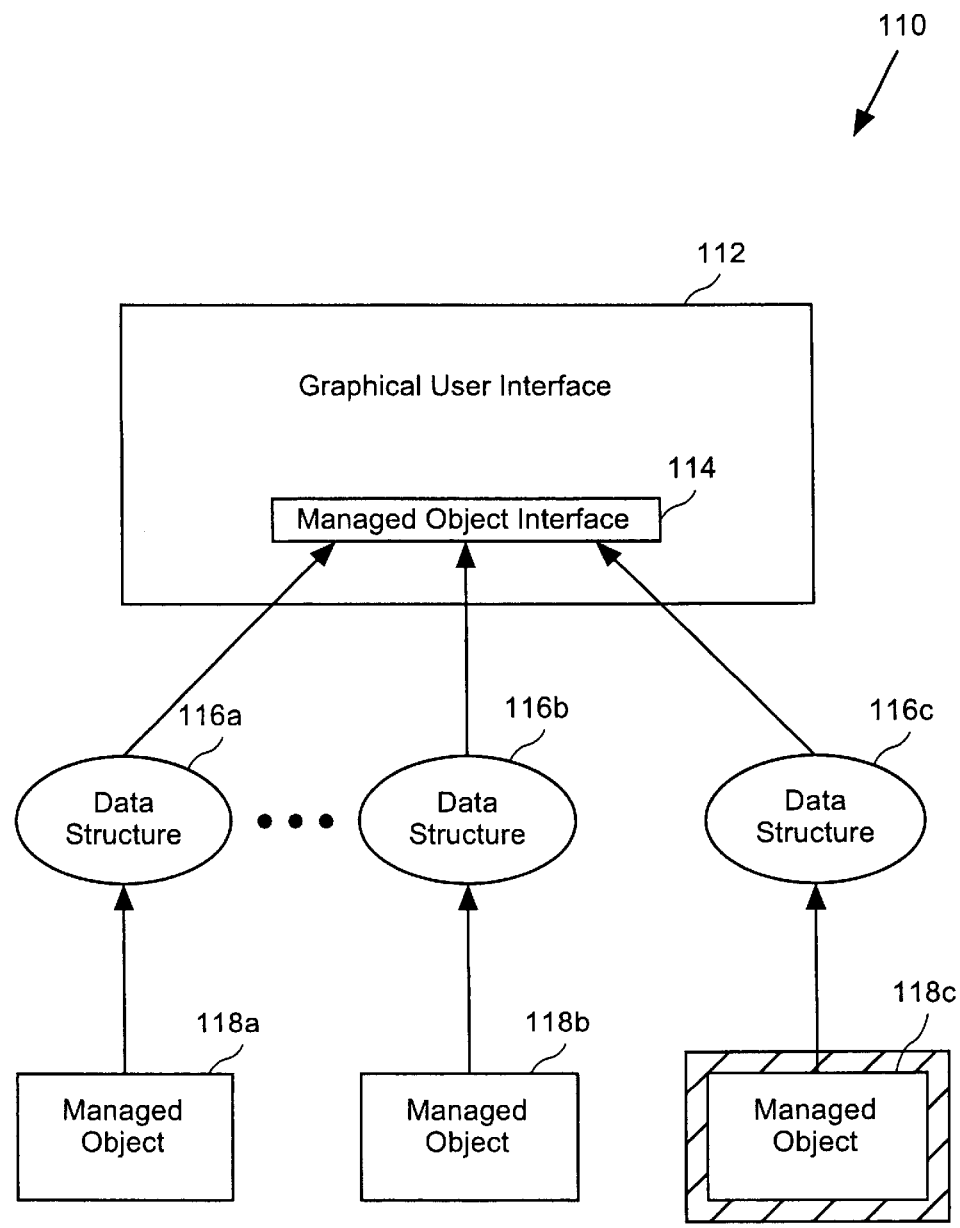
FIG. 1B is a block diagram illustrating the conventional communication protocols that may be exchanged between a group of managed objects and a graphical user interface.
Figure 2A:
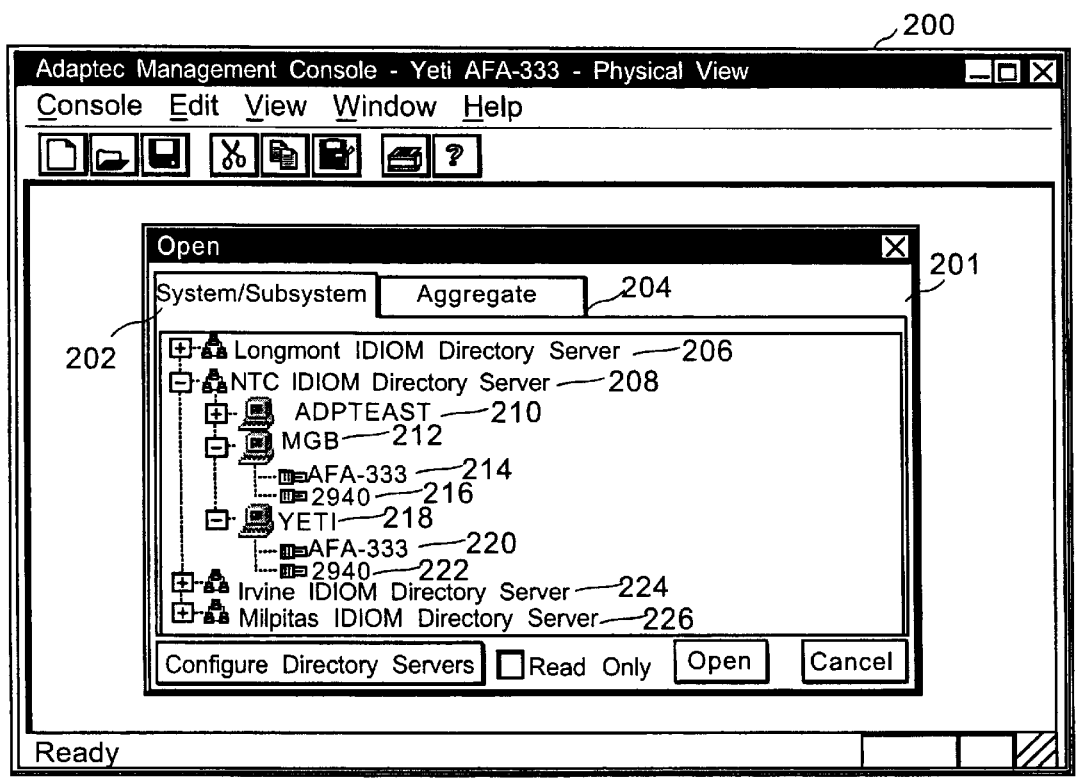
FIGS. 2A–2B show a graphical user interfaces that is implemented to carry out storage management functions in accordance with one embodiment of the present invention.

FIG. 2A shows a graphical user interface 200 that is implemented to carry out storage management functions in accordance with one embodiment of the present invention. As shown, the graphical user interface 200 is representative of the look and feel that may be presented to the user of a management console computer that is used for managing storage devices that are networked throughout a particular managed network. In this example, a directory view 201 provides a list of various systems and subsystems 202 that are coupled to a network that is in communication with a management console computer.

For example, the directory view 201 shows that there is a Longmount IDIOM Directory Server 206, an NTC IDIOM Directory Server 208, an Irvine IDIOM Directory Server 224, and a Milpitas IDIOM Directory Server 226, which define the systems displayed in the directory view 201. In general, a system is a single computing entity which hosts an operating system and manages some set of resources. There is also a couple of systems labeled ADPTEAST 210, MGB 212, and YETI 218, which are physically connected to the system 208. Further shown are a couple of adapter cards (i.e., subsystems) that are identified as AFA-333 214 and 2940 216, and which are connected to the MGB 212 system. In this example, subsystem 214 is a three-channel plug-in file system, and subsystem 216 is a SCSI card.

System YETI 218 also includes a subsystem 220 and a subsystem 222. As used herein, a subsystem is a portion of the primary system that manages some subset of that system's online storage. An example of a subsystem is a disc controller card and its associated storage devices and enclosures.

In general, the software code programmed to control the graphical user interface 200 builds upon "inherent" and "injected" behaviors. An "inherent" behavior stems from the fact that the graphical user interface 200 of the management console must make some assumptions about the managed objects that may be connected to some of the subsystems identified in the directory view 201. Some of these assumptions include that an IDIOM Directory Server (i.e., systems 206, 208, 224, 226, and the like), are connected to a given network that is being managed.

Accordingly, the IDIOM Directory Servers will contain a list of "known" systems that are running IDIOM-based services for one or more storage devices that are coupled to the subsystems 214, 216, 220, and 222. In this manner, the existence of a set of object classes, instances of which are discoverable from any given IDIOM subsystem, will be logically connected to the management console in some well defined fashion. By way of example, any one of the systems have subsystems which are connected to storage units via a given interface. Thus, the storage units may be potentially divided into one or more logical spaces which, may in turn be coalesced into one or more containers, etc.

On the other hand, "injected" behavior is that functionality that is presented to the end user through the management console framework, which does not come from the graphical user interface 200 itself, but alternatively, is integrated as part of a managed object. As will be described in greater detail below, the managed object will have a plurality of facets which contain a particular view's attributes, relationships, and methods, and are then communicated by the managed object to the graphical user interface 200. Although there are many functionalities which may be integrated into a particular managed object, there are some essential functionalities which should be integrated into the managed object in accordance with one embodiment of the present invention.

For example, the managed objects will have its own code for graphically presenting itself to the graphical user interface 200. In this manner, the graphical user interface 200 can represent that managed object in the appropriate physical and logical representations. These graphical representations range from simple icons used to represent the managed object, to complex representations provided by the managed object to represent some specific view of that managed object. The managed object will also have the ability to present an interface that has access to the functionalities (i.e., methods) that are provided by the managed object. Such interface may also include menus that interface with the methods that operate on the object's data, and panels that represent the properties of the managed object, and where needed, provide for interaction with those properties.

The graphical user interface 200 is therefore a multiple view application in which the user can manage the resources of a single server, a single subsystem, or a collection of resources from any number of systems/subsystems. In the directory view 201, a simple tree control is provided, although other known presentation formats may also be used to represent the exemplary physical or logical views.

The directory view 201 also provides an aggregate function 204. The aggregate function 204 when selected, may display the file system which is typically operating system (OS) dependent, and enables the presentation of available files resident in the management console or on devices over the network. In one embodiment, once the aggregate function 204 is selected, the window may be displayed via JFC's JFileChoose panel. As is well known to those skilled in the art, JFC is part of the Java programming language, which is available from Sun Microsystems, Inc., of Mountain View, Calif. For more information on Java programming and techniques for generating graphical user interfaces, reference may be made to a book entitled "Inside Java," by Karanjit S. Siyan, Ph.D. and James L. Weaver, New Rider Publishing (1997). This book is hereby incorporated by reference.

Figure 2B:
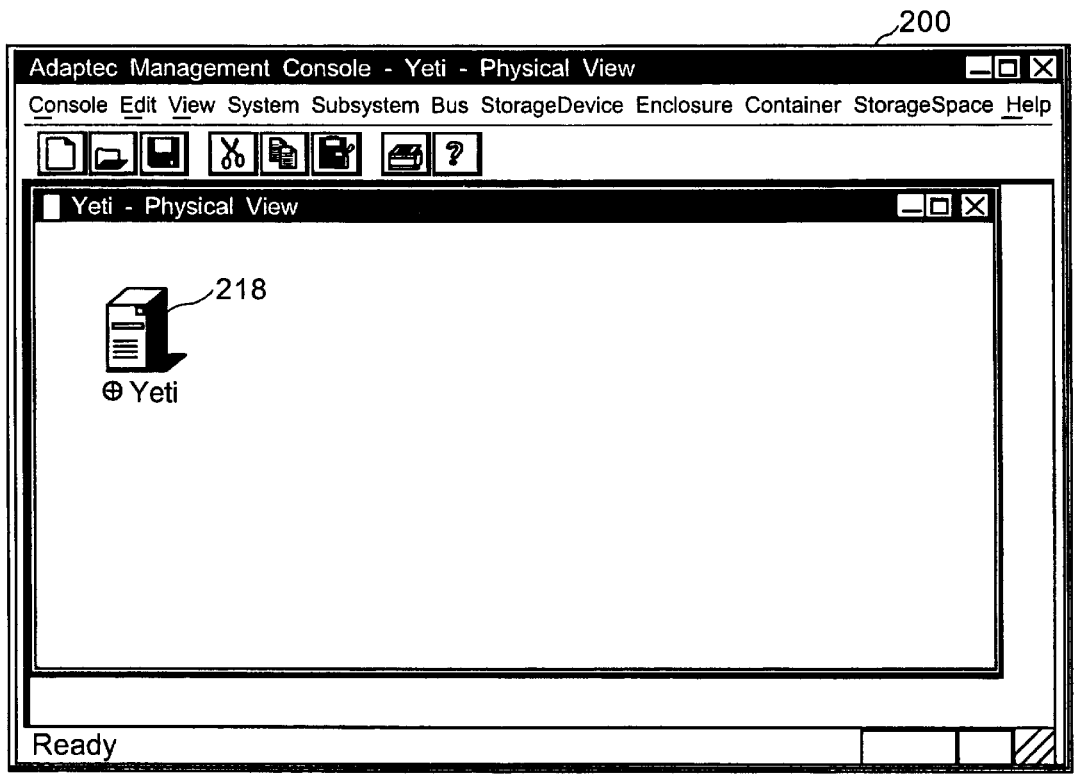
Figure 2C:
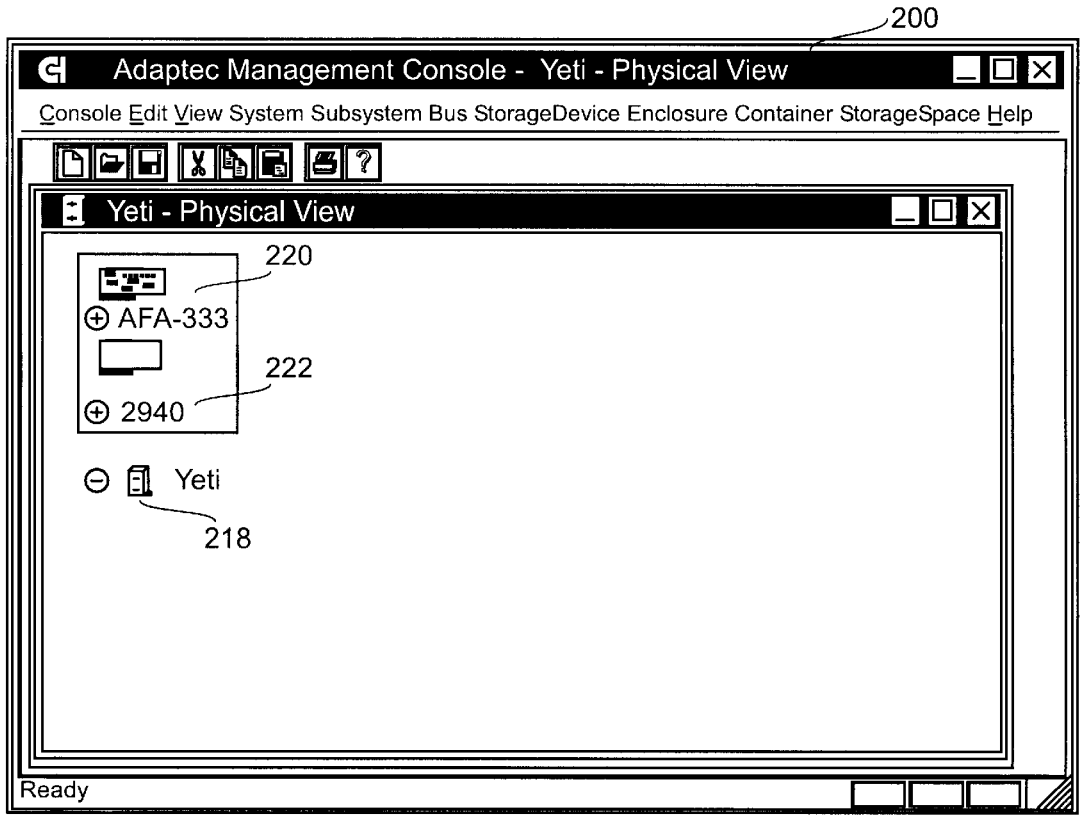
FIGS. 2C–2D show graphical representations of the physical relationships of various managed objects that are connected to subsystems of a network in accordance with one embodiment of the present invention.

FIG. 2B shows a physical view of system 218 YETI once it has been selected from the directory view 201 of FIG. 2A. Because system 218 YETI has a plus sign "+", a user may now click on the plus sign to expand the physical view of YETI 218. As shown in FIG. 2C, the expanded view shows that subsystems 220 and 222 are physically connected to YETI 218. Each of the subsystems 220 and 222 have a respective plus sign, which indicates that there is at least one managed object physically connected to those respective subsystems. Once the plus signs of the respective subsystems 220 and 222 are selected by the user of the graphical user interface 200, an expanded view is shown in FIG. 2D.

By way of example, subsystem 220 is shown having a bus 230 which is physically connected to managed objects 231a through 231h. A second bus 232 is also connected to subsystem 220. The second bus 232 includes physical managed objects 233a through 233f. And finally, subsystem 222 has a bus 234 that is physically coupled to managed objects 235a through 235f. In this example, the managed objects are shown to be physical storage devices, but of course, they can actually be any device having an object that needs to be managed in some way.

Figure 2D:
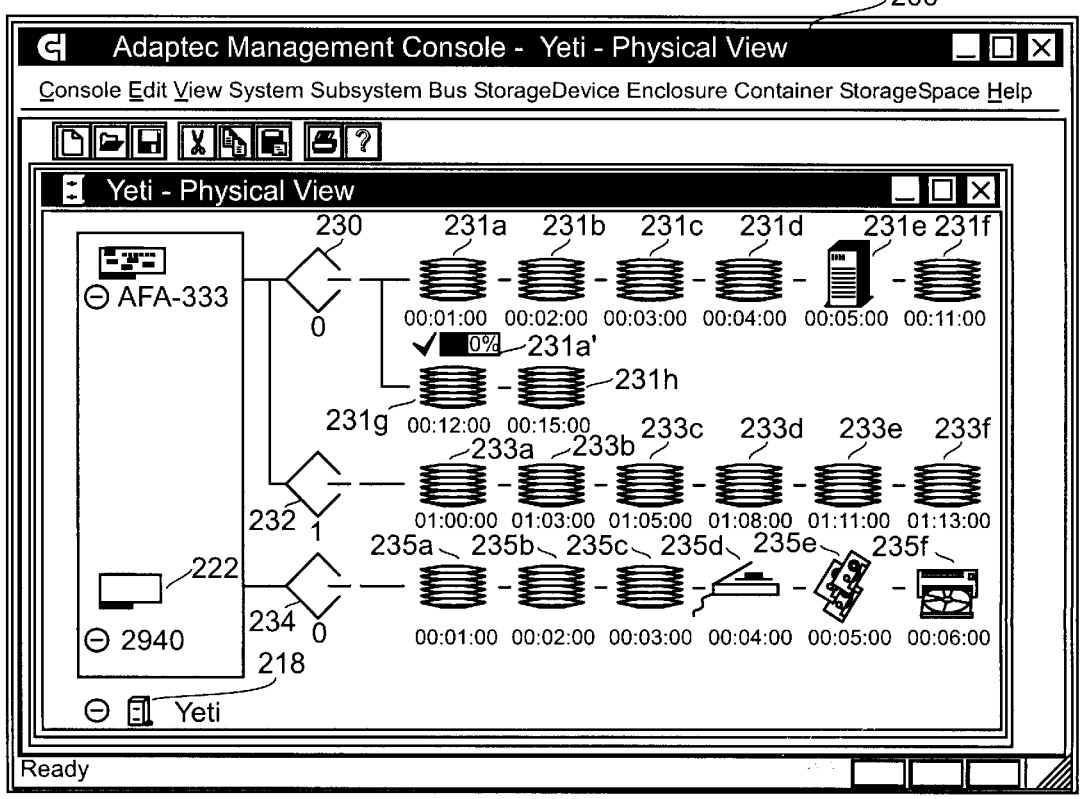

In the physical view of FIG. 2D, managed object 231a is provided with a graphical task indicator 231a', which indicates when a task is actually being executed on the exemplary managed object 231a. Although not shown, all other managed objects may also have their associated task indicators. As pictorially illustrated, the types of data storage devices and their associated managed objects are numerous, and may include hard drives, databases, scanner devices, tape drives, optical drives, etc.

Figure 2E:
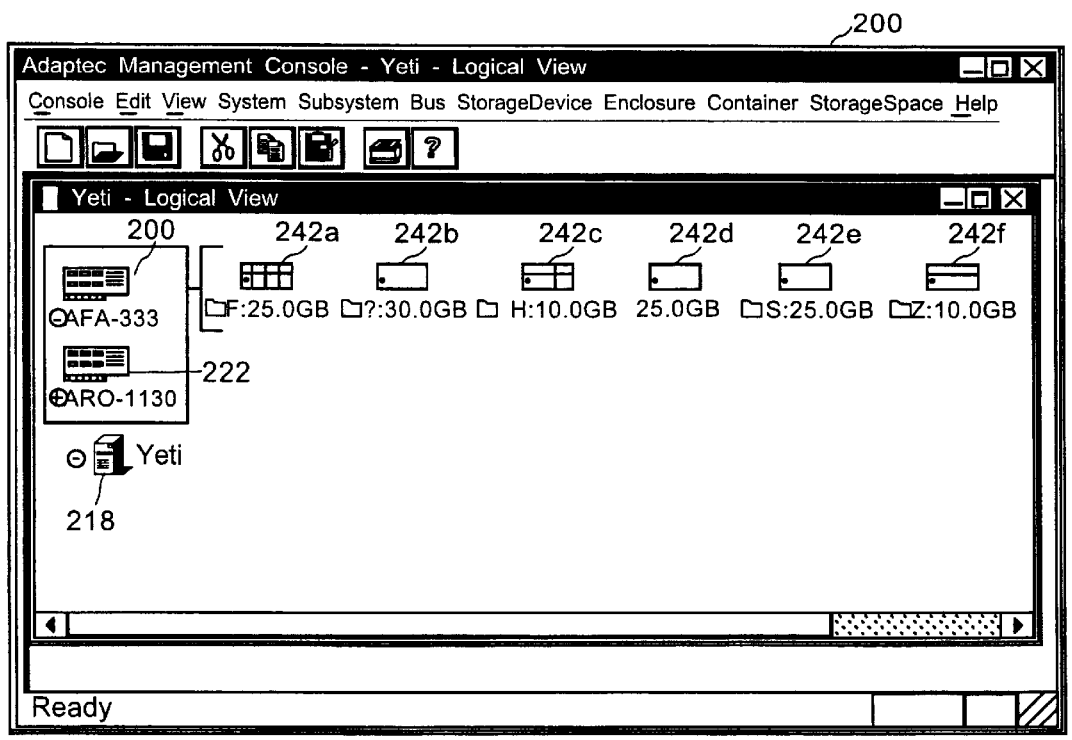
FIGS. 2E–2F graphically show logical representations of the managed objects that are managed via a graphical user interface in accordance with one embodiment of the present invention.
Figure 2F:
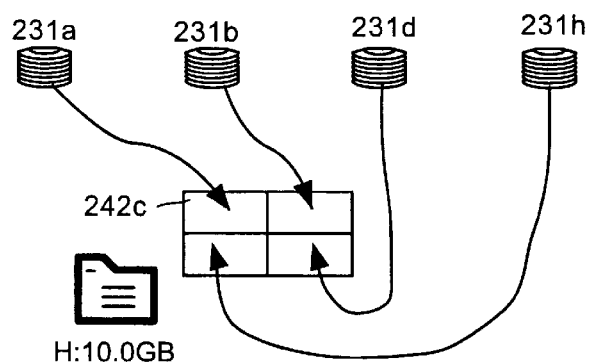

FIG. 2E shows the graphical user interface 200 which identifies the logical view of the storage devices that may be coupled to a subsystem 220 in accordance with one embodiment of the present invention. It should be understood that a logical view illustrates the logical elements that are being managed through the system YETI 218. By way of example, containers 242a through 242f illustrate data storage containers that may be made up of bits and pieces from several different physical storage devices. As shown in FIG. 2F, container 242c, which is identified as partition "H," has 10 gigabytes (GB) of data logically stored therein. In this example, container 242c only logically contains portions from managed objects 231a, 231b, 231d, and 231h.

It should be understood that the icons provided to the graphical user interface 200 are actually obtained from the managed objects themselves. That is, the managed objects will provide the graphical user interface 200 with the associated icon data, labels, and displayable attributes. In addition, the logical containers will also include any associated methods for managing the data injected by those managed objects.

Figure 3A:
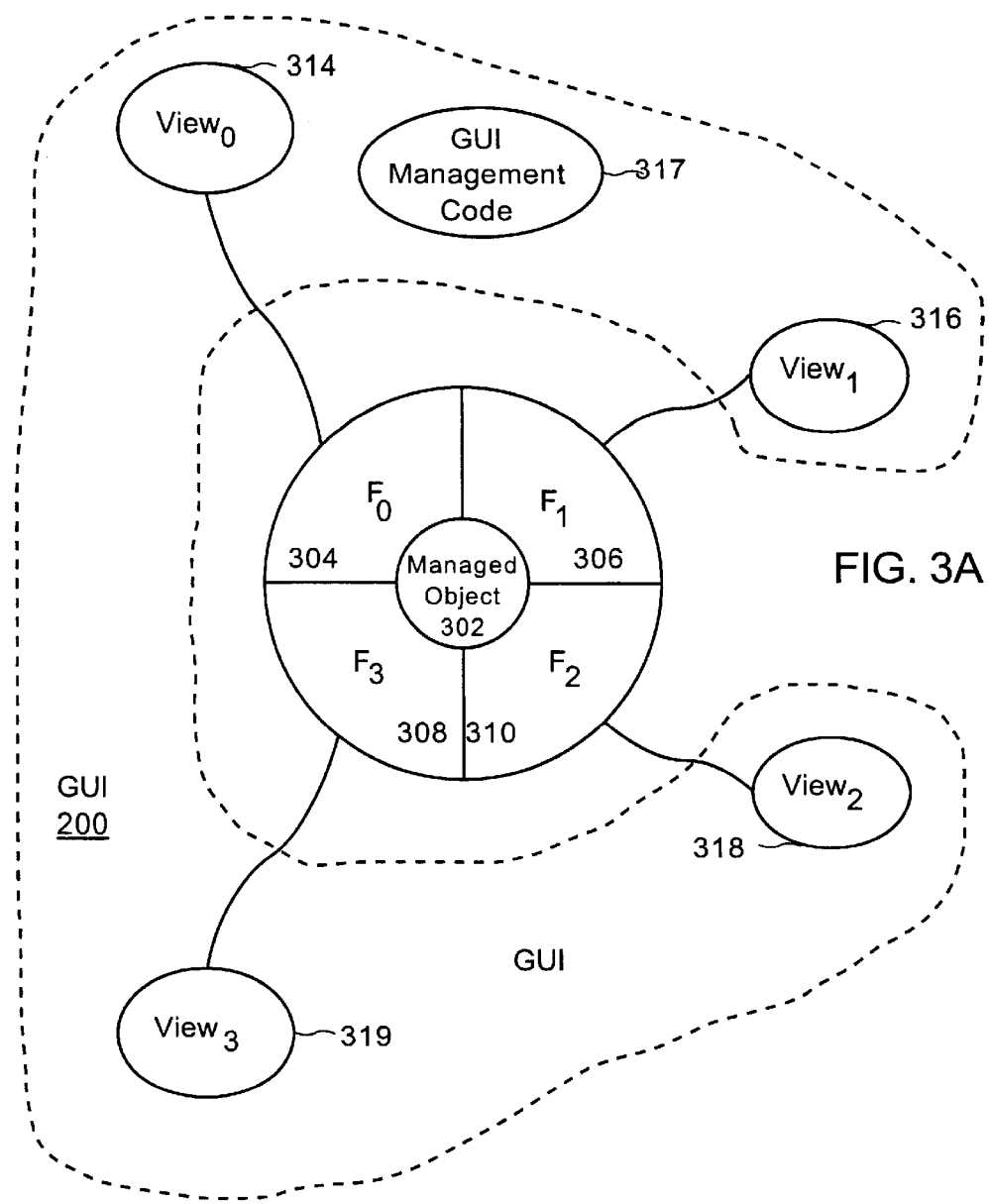
FIGS. 3A–3B show graphical representations of a managed object that is in communication with a graphical user interface in accordance with one embodiment of the present invention.

FIG. 3A shows a graphical representation of a managed object 302 that is in communication with a graphical user interface (GUI) 200 in accordance with one embodiment of the present invention. The managed object 302 preferably includes a plurality of facets, shown as $F_0$ 304, $F_1$ 306, $F_2$ 310, and $F_3$ 308. By way of example, facet $F_1$ 306 is used as an interface for selected views of the managed object 302. Each facet is therefore configured to access attributes 320, relationships 322, and methods 324 for a particular view of the managed object 302. Of course, different display relationships, and managed functions will be required for different types of objects, storage devices, and peripheral devices that may be networked and managed by a management console computer interface. In this example, the facet $F_1$ 306 is configured to communicate with a $view_1$ 316, which is integrated and designed to be part of the graphical user interface 200.

In general, the views that are integrated into the graphical user interface 200 are generic views, which are configured to communicate with the various facets of a managed object 302. As such, a $view_0$ 314 will communicate with the facet $F_0$ 304, a $view_2$ 318 will communicate with the facet $F_2$ 310, and a $view_3$ 319 will communicate with the facet $F_3$ 308. In this embodiment, the various views that are integrally programmed to be part of the graphical user interface 200 are generic views, which are configured to interface with associated facets of the various managed objects. In yet another embodiment, the views themselves may be injected to the GUI by the managed object, which will eliminate the need for the GUI to have a set of generic views.

Accordingly, the graphical user interface 200 will not include the various attributes, relationships, and methods for every possible managed object, but alternatively will be provided by each managed object to the graphical user interface 200. As is well known, the graphical user interface 200 will also include GUI management code 317 for managing the various components of the generic graphical user interface 200. As mentioned above, once a storage device which has its custom managed object software is connected to a particular subsystem in a networked environment, that managed object will present the attributes 320, relationships 322 and methods 324 of the various facets to the graphical user interface 200. In other embodiments, the graphical user interface will go out and seek the particular attributes, representations and methods of the networked objects via the object's facet interface.

Advantageously, if future developments, updates, or revisions are performed on the managed object in order to provide it with additional functionalities or amend an existing functionality, those changes need not be made to the graphical user interface 200. Alternatively, the facets of the managed object will provide the changed attributes 320, relationships 322 and methods 324 directly to the graphical user interface 200 via facet $F_1$. Thus, the software development team that is in charge of maintaining a graphical user interface 200 will not have to continually update the code of the GUI each time a change is made to the various attributes, relationships or methods of the given managed objects that are being managed from GUI 200 (i.e., that is resident on a management console computer). As can be appreciated, the embodiments of the present invention provide a substantial savings in time, effort and resources that would be need to continuously update and test the inter-operability of the graphical user interface 200 with the various managed objects that may be connected to a particular networked system.

Figure 4:
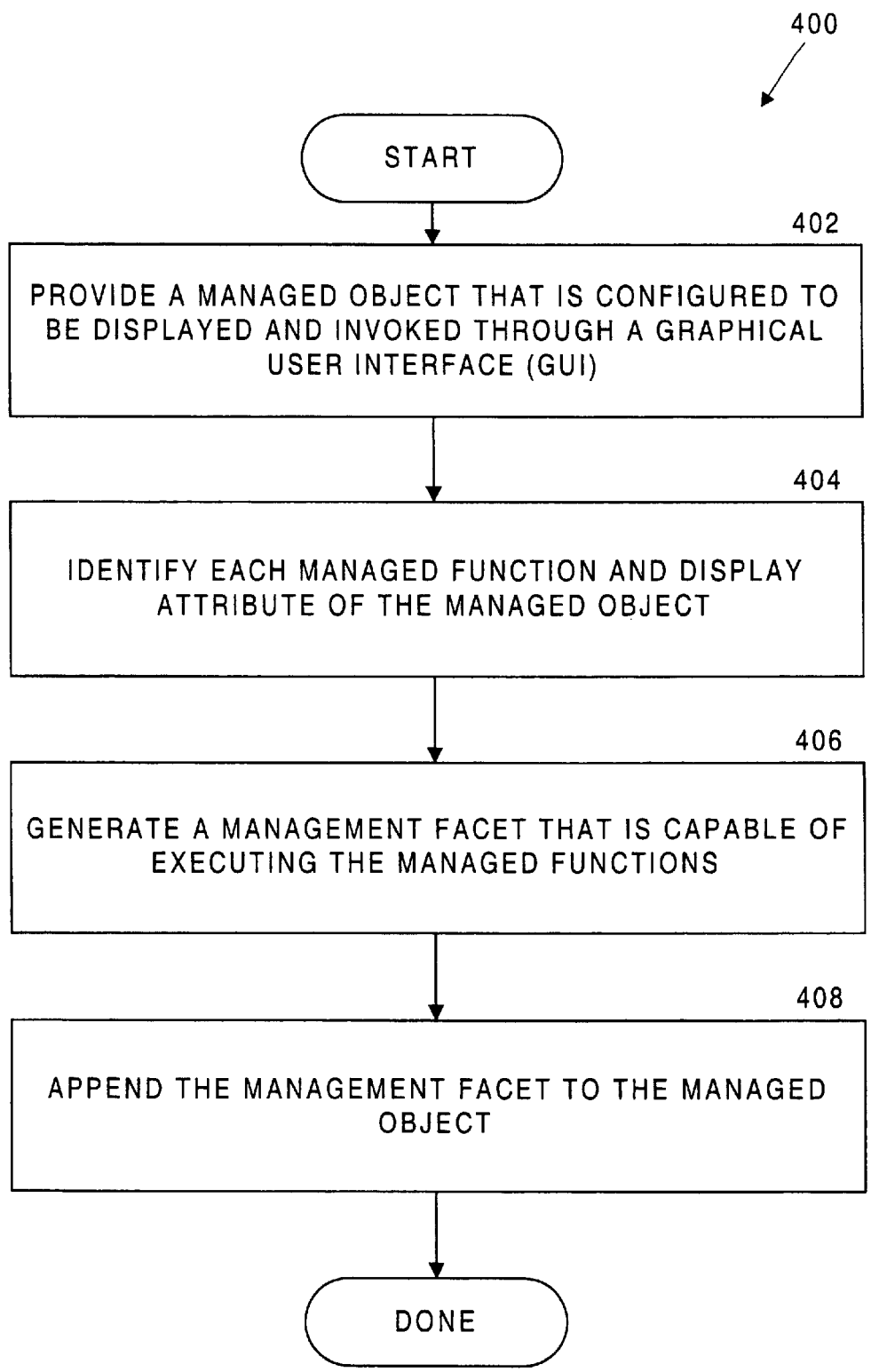
FIG. 4 shows a flowchart diagram of the method operations performed in generating a managed object having management facets for communicating with a graphical user interface that is used to manage storage devices over a network, in accordance with one embodiment of the present invention.

FIG. 4 shows a flowchart diagram 400 of the method operations performed in generating a managed object having management facets for communicating with a graphical user interface that is used to manage storage devices over a network. The method begins at an operation 402 where a managed object that is configured to be displayed and invoked through a graphical user interface is provided. By way of example, the managed object may be the software algorithms and data that represents the physical and logical aspects that control a storage device that is networked with a management console computer having the management graphical user interface.

The method now proceeds to an operation 404 where each managed function and display attribute of the managed object is identified. By way of example, a managed object may be displayed in many ways to illustrate its attributes through a graphical user interface. The managed object may also have several functional features (i.e., its associated methods) that may be executed by gaining control of that managed object through the graphical user interface. Once each of the managed functions and display attributes of the managed object are identified, the method proceeds to an operation 406.

Figure 3B:
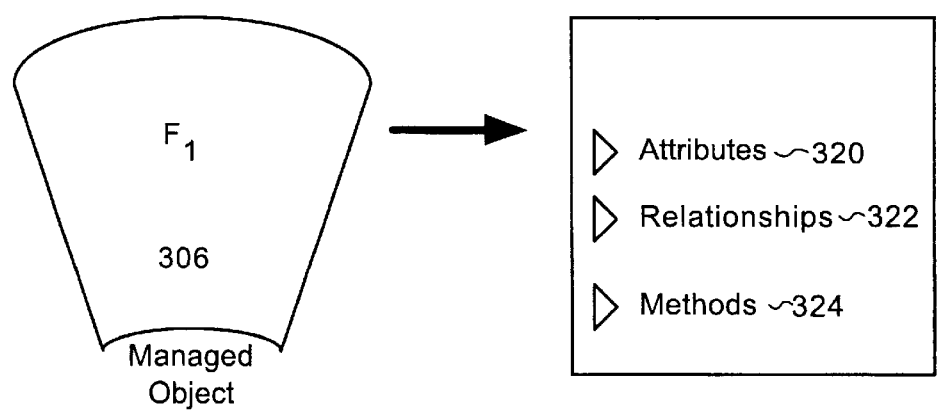

In operation 406, a management facet that is capable of executing the managed functions is generated for each of the identified managed functions and display attributes. As shown in FIGS. 3A and 3B, a managed object 302 may have four facets $F_0$ through $F_3$ (or any number), which are associated with different respective views of the same managed object. In addition, each of the facets integrate respective attributes, relationships, and methods that may be called through its particular facet. Once the management facets are generated in operation 406, the method proceeds to an operation 408. In operation 408, the management facets are appended to the managed object itself.

In this manner, each managed object will have one or more facets which integrate their various attributes, relationships and methods directly with the managed object, and are thereafter made available to the graphical user interface of a given management console. As mentioned above, because the management facets incorporate the unique attributes, relationships and methods of a particular managed object, the graphical user interface of the management console need not be repetitively updated to take into account the features that are integrated into the various facets of a managed object. Therefore, the various facets essentially form a wrapper interface defining a second level of methods around a managed object.

Figure 5:
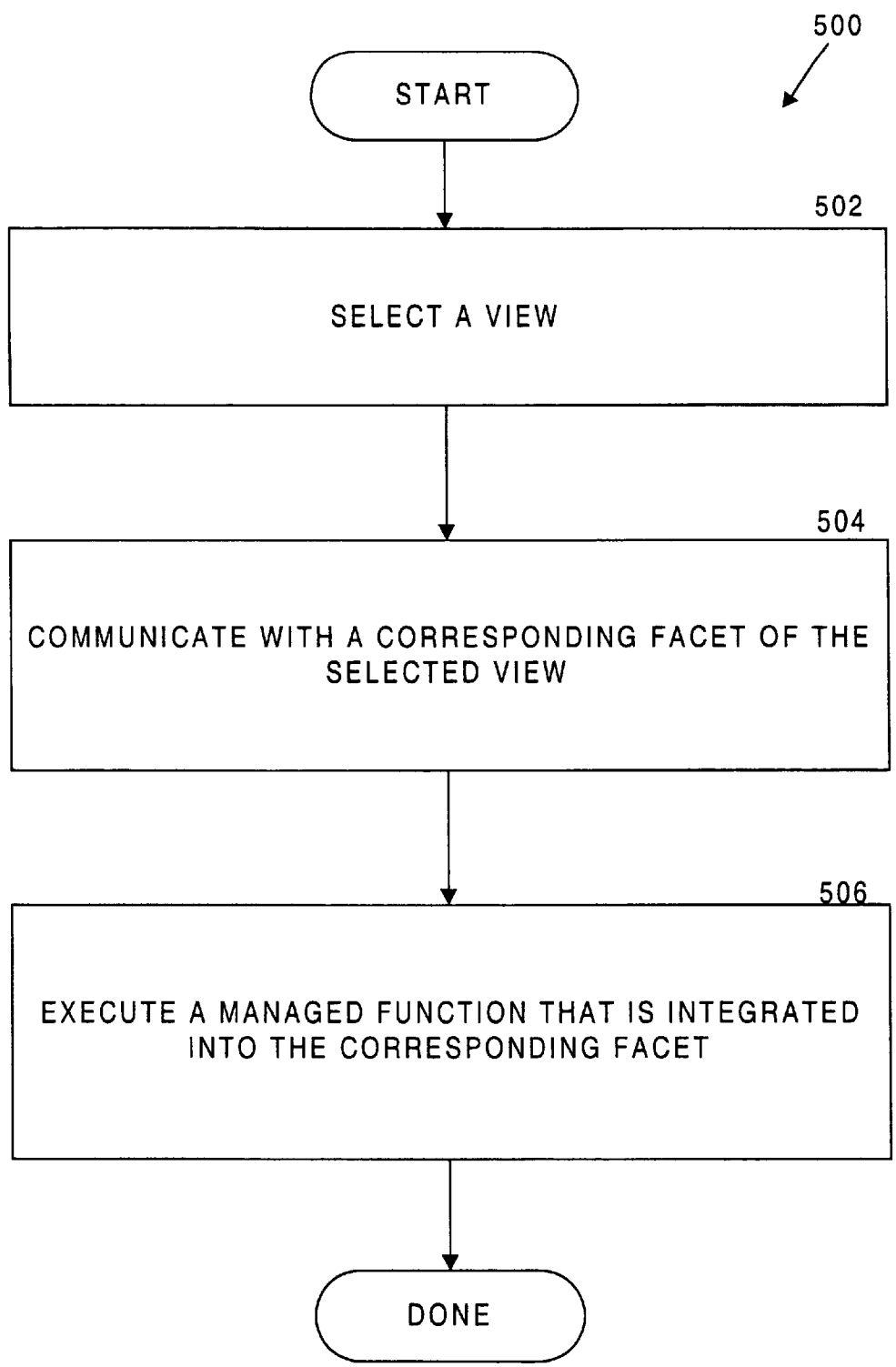
FIG. 5 shows the method operations performed in invoking a managed function of a given facet in accordance with one embodiment of the present invention.

FIG. 5 shows the method operations performed in invoking a managed function of a given facet in accordance with one embodiment of the present invention. The method begins at an operation 502 where a view of the managed object is selected from the graphical user interface 200 of FIGS. 2A through 2E. For example, if view, 316 is selected by the user of the management console, the view, 316 of the graphical user interface 200 will communicate and make the particular calls to the methods of a corresponding facet $F_1$ 306, of the managed object 302 in operation 504. Once a link has been established with the appropriate facet of the selected view, the method will proceed to an operation 506.

In operation 506, a managed function (i.e., method) that is integrated into the corresponding facet may be executed. Of course, the calls that trigger the attributes, relationships, and methods of that particular facet will be controlled by the graphical user interface 200, without having to integrate those code features into the graphical user interface itself. Once the managed function has been executed in operation 506, the method of invoking a managed function will be done.

Figure 6:
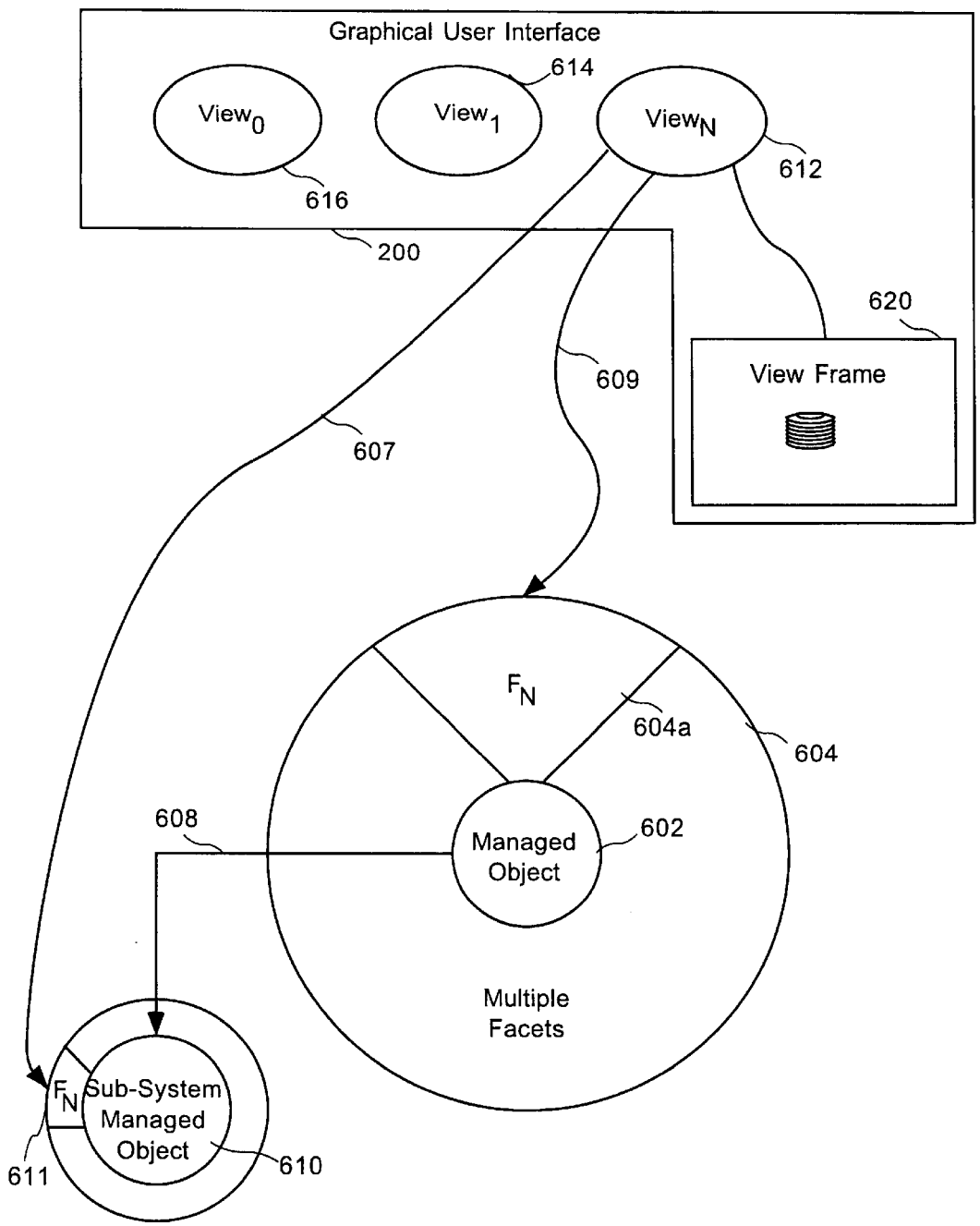
FIG. 6 shows a graphical representation of a managed object having multiple facets for linking with particular views of a graphical user interface in accordance with one embodiment of the present invention.

FIG. 6 shows a graphical representation of a managed object 602 having multiple facets 604 for linking with particular views of the graphical user interface 200. In this example, a facet $F_N$ 604a communicates via a link 609 to the associated view$_N$ 612 that is contained within the graphical user interface 200. The view$_N$ 612 which is function-independent, is configured to display the view of that particular facet in a view frame 620.

As mentioned above, the managed object 602 contains all of the semantics associated with the functions of the managed object and is also capable of communicating with subsystem managed objects 610. The subsystem managed object 610 will also preferably have a wrapper of multiple facets that enable it to communicate with the graphical user interface independently. As shown, the managed object 602 is configured to manage the subsystem managed object 610 through a link 608, and a facet 611 of the subsystem managed object 610 communicates with the view$_N$ 612 via a link 607.

The view$_N$ 612 may also communicate with the view frame 620 to adequately call and invoke the attributes of the particular managed object or subsystem managed object. As mentioned above, the graphical user interface 200 may also include numerous other views, which are function-independent, view-sensitive, and can display methods, and may communicate and call the methods of unique facets of a given managed object.

Figure 7:
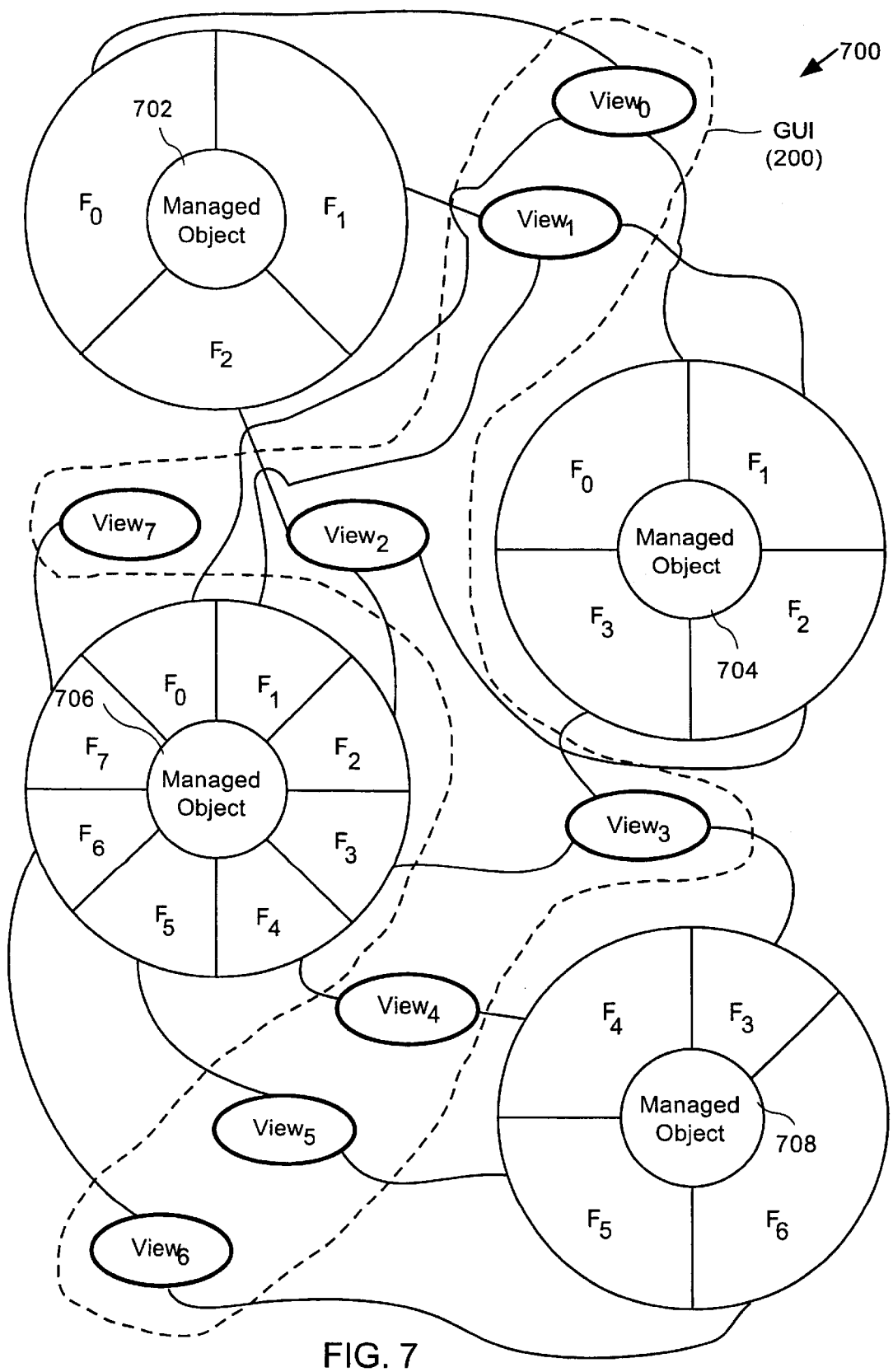
FIG. 7 shows a managed object interrelationship diagram in accordance with one embodiment of the present invention.

FIG. 7 shows a managed object interrelationship diagram 700 in accordance with one embodiment of the present invention. For exemplary purposes, managed objects 702, 704, 706, and 708 are illustrated having a variety of different facets for communicating with particular views of a graphical user interface 200. In this example, many of the managed objects share the same or similar types of facets, and will therefore require access to the same view that is integrated into the graphical user interface 200. As mentioned above, the particular views are function-independent, view sensitive, and display methods.

In the example shown, facet $F_0$ in each of managed objects 702, 704, and 706 are virtually linked to the view$_0$. In a like manner, view$_1$, view$_2$, view$_3$, view$_4$, view$_5$, view$_6$, and view$_7$ each are capable of accessing (i.e., calling) their respective facets in the various managed objects that are accessed by the graphical user interface 200. Accordingly, the design and management of the graphical user interface will be minimized because updates associated with each managed object will no longer have to be performed in the software code of the graphical user interface 200. That is, the attributes, relationships and methods of each managed object are integrated in a wrapper of facets around each respective managed object and therefore, are de-coupled from the graphical user interface 200.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 8:
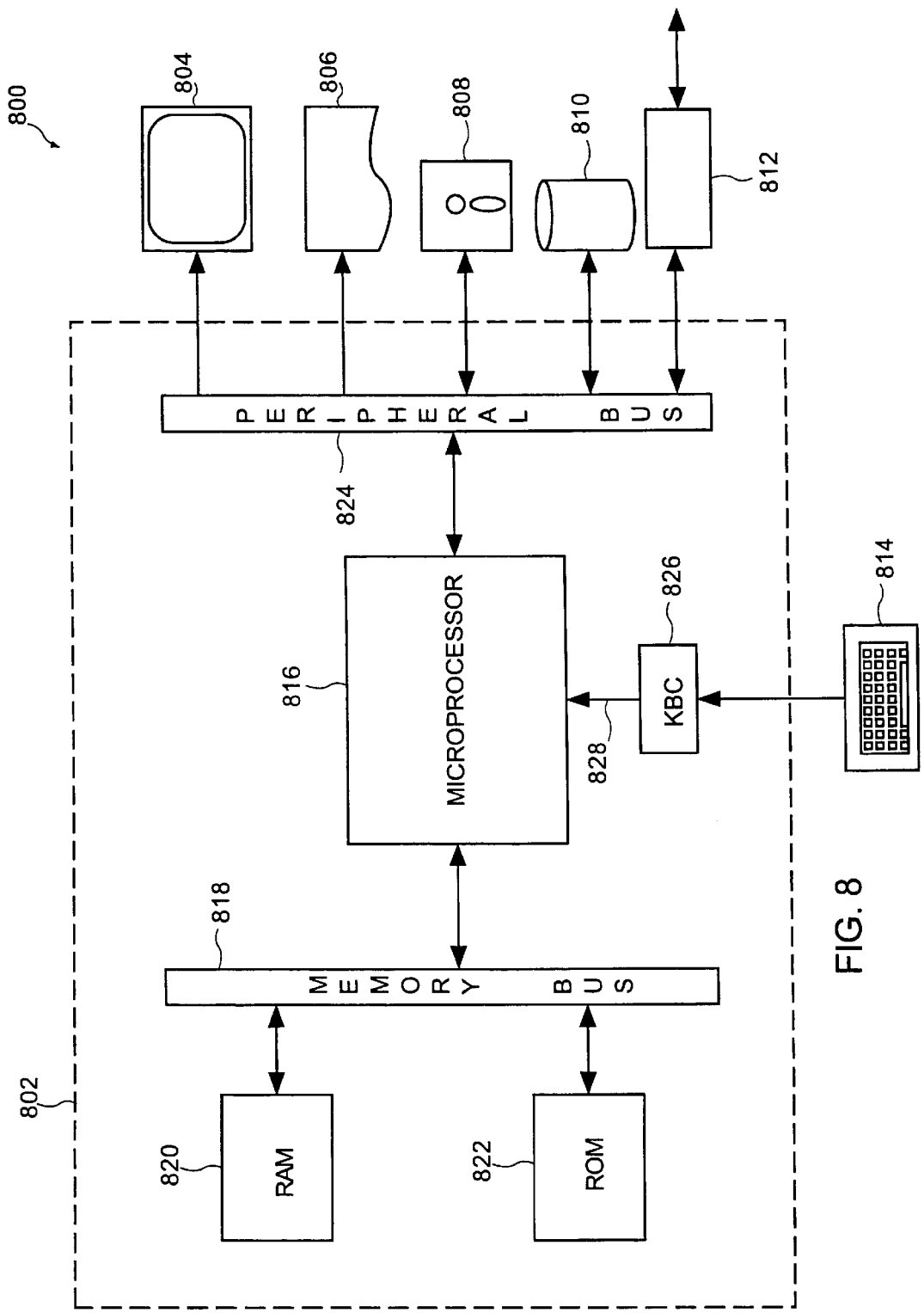
FIG. 8 is a block diagram of an exemplary computer system for carrying out some of the processing according to the invention.

FIG. 8 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 800 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices. According to the invention, a particular function of microprocessor 816 is to assist in the execution of the object-oriented code that is used to manage generic objects (i.e., that are not necessarily used for storage), and the objects of storage devices from a management console GUI.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 810. The computer code and data could also reside on a removable program medium and loaded or installed onto the computer system 800 when needed. Removable program mediums include, for example, CD-ROM, PC-CARD, floppy disk and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for making a managed object that is in communication with a management console that is used for storage device management over a network, comprising:

building an object having a data structure and a method for operating on the data structure, the object represents a set of basic functions of a storage device that is being managed over the network;

identifying at least one display function of the managed object that will be used to display a view of the managed object through the management console, the at least one display function includes an attribute, a relationship, and a display method of the managed object;

associating the at least one display function with the managed object so that the managed object can communicate with the management console through the at least one display function;

generating a graphical user interface that is executed on the management console, the graphical user interface is configured to communicate with the at least one display function of the managed object;

altering the data structure and the method of the managed object to create a new managed object; and modifying the at least one display function to enable code interaction between the modified data structure and the new managed object.

2. A method for making a managed object as recited in claim 1, wherein the at least one display function is de-coupled from the graphical user interface of the management console.

3. A method for making a managed object as recited in claim 2, wherein the at least one display function forms a facet of the managed object.

4. A method for making a managed object that is in communication with a management console that is used for device management over a network, comprising:

building an object having a data structure and a method for operating on the data structures the object represents a set of basic functions of a device that is being managed over the network;

identifying at least one display function of the managed object that will be used to display a view of the managed object through the management console;

associating the at least one display function with the managed object so that the managed object can communicate with the management console through the at least one display function;

altering the data structure and the method of the managed object to create a new managed object;

modifying the at least one display function to enable code interaction between the modified data structure and the new managed object; and generating a graphical user interface that is executed on the management console, the graphical user interface is configured to communicate with the at least one display function of the managed object;

wherein the at least one display function is de-coupled from a graphical user interface of the management console, and the at least one display function forms a facet of the managed object.

5. A method for making a managed object as recited in claim 4, wherein the facet functions as a method interface wrapper of the managed object.

6. A method for making a managed object that is in communication with a management console that is used for storage device management over a network, comprising:

building an object having a data structure and a method for operating on the data structure, the object represents a set of basic functions of a storage device that is being managed over the network;

identifying at least one display function of the managed object that will be used to display a view of the managed object through the management console, the at least one display function includes an attribute, a relationship, and a display method of the managed object;

associating the at least one display function with the managed object so that the managed object can communicate with the management console through the at least one display function;

generating a graphical user interface that is executed on the management console, the graphical user interface is configured to communicate with the at least one display function of the managed object;

altering the data structure and the method of the managed object to create a new managed object; and modifying the at least one display function to enable code interaction between the modified data structure and the new managed object;

wherein the at least one display function forms a facet of the managed object.

7. A method for making a managed object as recited in claim 6, further comprising:

calling the display method of the managed object through the graphical user interface.

* * * * *